Sept. 5, 1967    G. EHRENBERG    3,340,540
LINEAR INDUCTION MOTOR FOR USE WITH
A MEASURING AND RECORDING DEVICE Filed Aug. 31, 1964    3 Sheets—Sheet 1

INVENTOR
GUSTAVE EHRENBERG

BY Seidel & Gonda

ATTORNEYS.

Sept. 5, 1967  G. EHRENBERG  3,340,540
LINEAR INDUCTION MOTOR FOR USE WITH
A MEASURING AND RECORDING DEVICE
Filed Aug. 31, 1964  3 Sheets-Sheet 2

INVENTOR.
GUSTAVE EHRENBERG
BY Seidel & Gonda
ATTORNEYS.

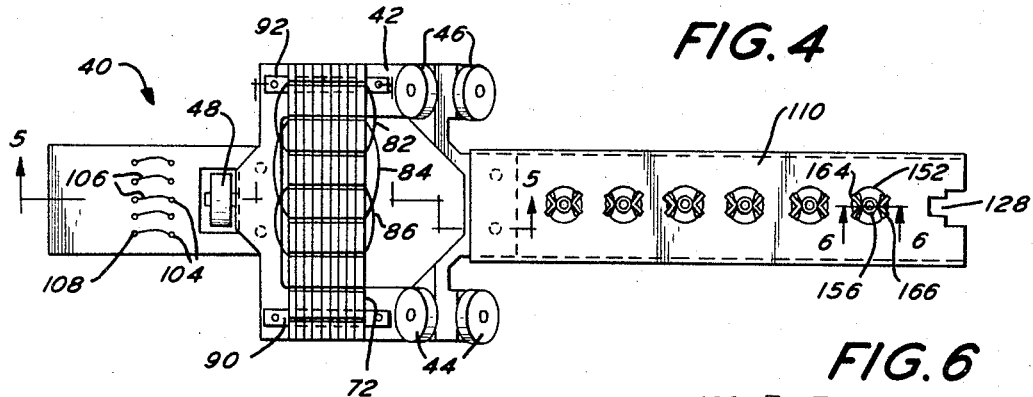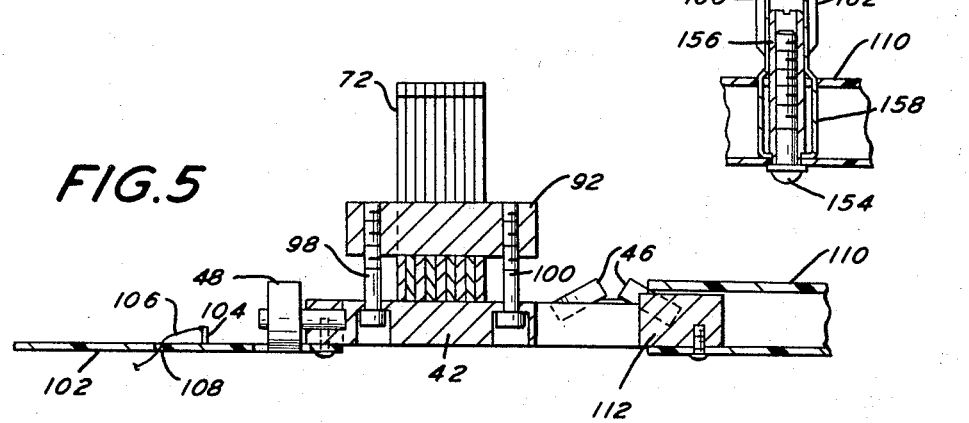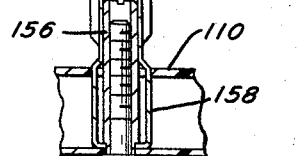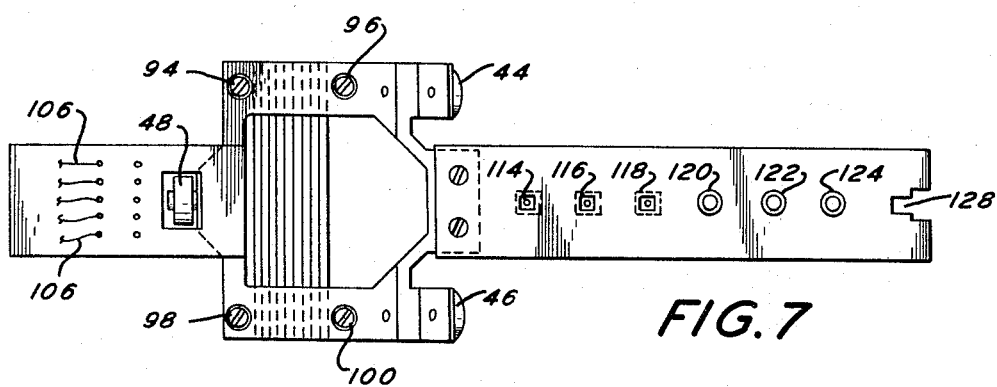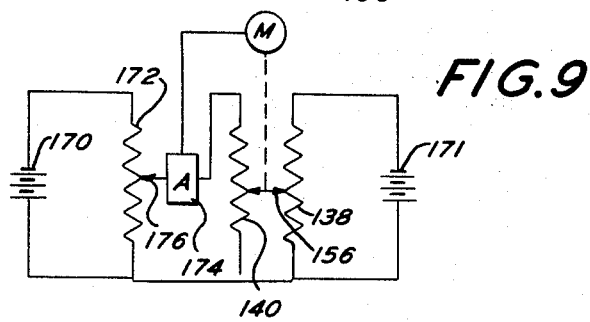
INVENTOR.
GUSTAVE EHRENBERG
BY Seidel & Gonda
ATTORNEYS.

United States Patent Office 3,340,540
Patented Sept. 5, 1967

3,340,540
LINEAR INDUCTION MOTOR FOR USE WITH A MEASURING AND RECORDING DEVICE
Gustave Ehrenberg, Havertown, Pa., assignor to Electro-Nite Co., a corporation of Pennsylvania
Filed Aug. 31, 1964, Ser. No. 393,087
18 Claims. (Cl. 346—139)

In general this invention relates to a new and improved linear induction motor. More particularly, it relates to a linear induction motor which is adapted for use with a measuring and recording device.

A rotary induction motor depends on the rotating magnetic field that is established around the air gap of the motor. The air gap is the gap between the stator and the rotor. The rotating magnetic field is established by alternating current flowing in the stator windings. The rotating magnetic field appears to move around the stator windings in a uniform speed in accordance with the current variations in the windings. The speed of the rotating magnetic field is independent of load variations on the motor.

The torque of the rotary induction motor is established by the interaction of the rotating magnetic field with a magnetic field created by induced currents in the armature windings. One of the most common types of armature or rotor windings utilized is the squirrel cage construction in which the rotor bars, usually uninsulated, are welded or brazed to copper end rings.

A linear induction motor is one which has its stator poles placed adjacent to one another along a straight line. This is in contradistinction to a rotary induction motor which has its poles placed adjacent to one another along the curve surface which falls back on itself to form a circle. In place of a squirrel cage rotor of the rotary induction motor, a linear induction motor built in accordance with the principles of the present invention, would utilize a stationary armature having flat pole pieces juxtaposed to a stator having flat pole pieces with a horizontal air gap between them. The provision of a horizontal gap facilitates more accurate control than can be obtained by any other motor.

The stator is mounted for reciprocal movement with only minimum contact for its support so as to reduce friction and provide a sensitive motor. The stator windings are provided in a manner to cause a traveling field. The stator is coupled to an instrument such as a recorder and a slidewire device as will be explained in greater detain hereinafter.

It is the general object of the present invention to provide a new and improved linear induction motor.

It is another object of the present invention to provide a small, inexpensive lightweight linear induction motor wherein a permanent record may be obtained in response to the relative movement between the armature and the stator.

It is another object of the present invention to provide a novel linear induction motor having a stator coupled to a slidewire device and recorder.

It is another object of the present invention to provide a novel slidewire device having infinite resolution.

It is another object of this invention to provide a novel means for mounting a slidewire device for use with the linear induction motor.

It is yet another object of this invention to provide a novel means for making movable contact with the potentiometer slidewire.

Other objects will appear hereinafter.

For the purpose of illustrating the invention, there is shown in the drawings a form which is presently preferred; it being understood, however, that this invention is not limited to the precise arrangements and instrumentalities shown.

FIGURE 4 is a top plan view of the stator and the potentiometer contact bar.

FIGURE 5 is a transverse sectional view of the stator shown in FIGURE 4 taken along the line 5—5.

FIGURE 6 is an enlarged partial sectional view of the slidewire contact mechanism taken along the line 6—6 in FIGURE 4.

FIGURE 7 is a bottom plan view of a stator shown in FIGURE 4.

FIGURE 9 is a schematic diagram illustrating one use to which the motor may be adapted.

Figure 1:
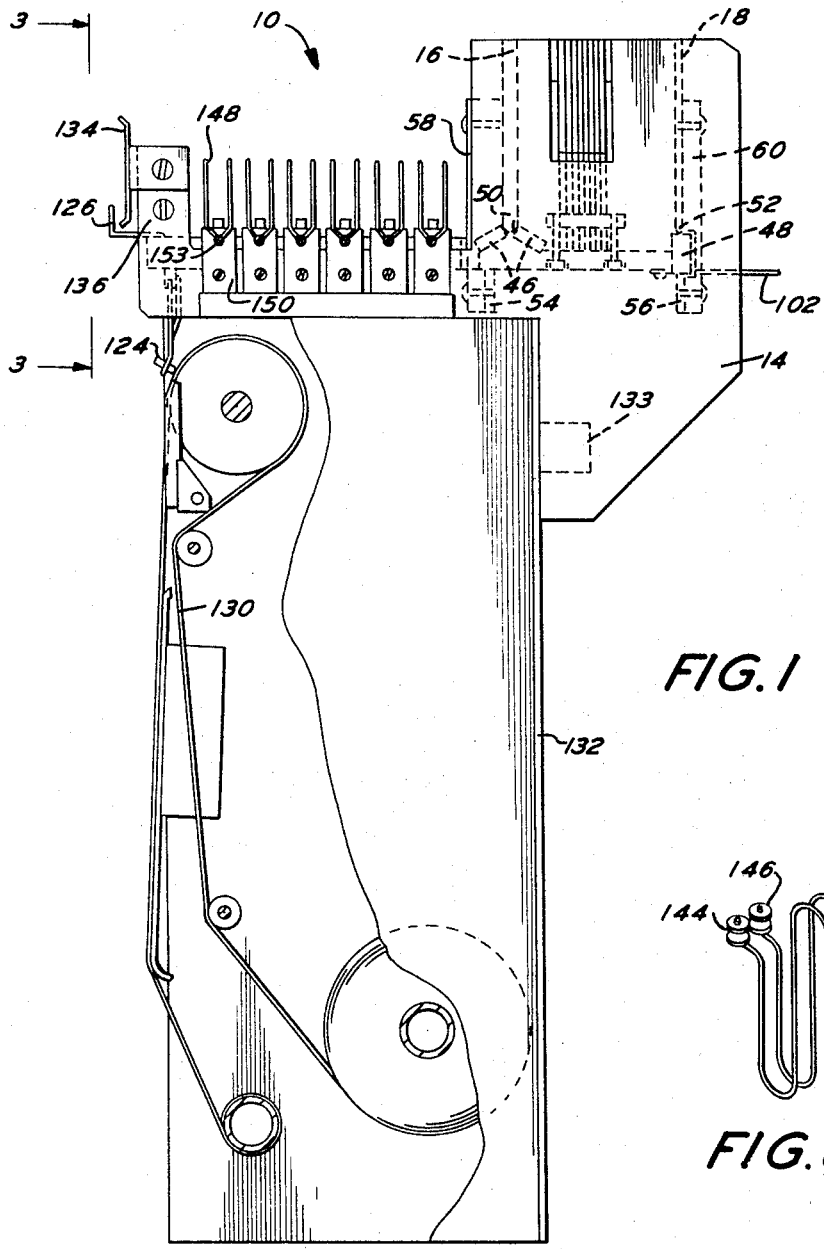
FIGURE 1 is a side view of the motor, slidewire device and recorder.

Referring now to the drawing in detail, wherein like numerals indicate like elements, there is shown a servomechanism 10 for recording a measured value. The servomechanism 10 includes a linear induction motor built in accordance with the present invention.

Figures 2, 3:
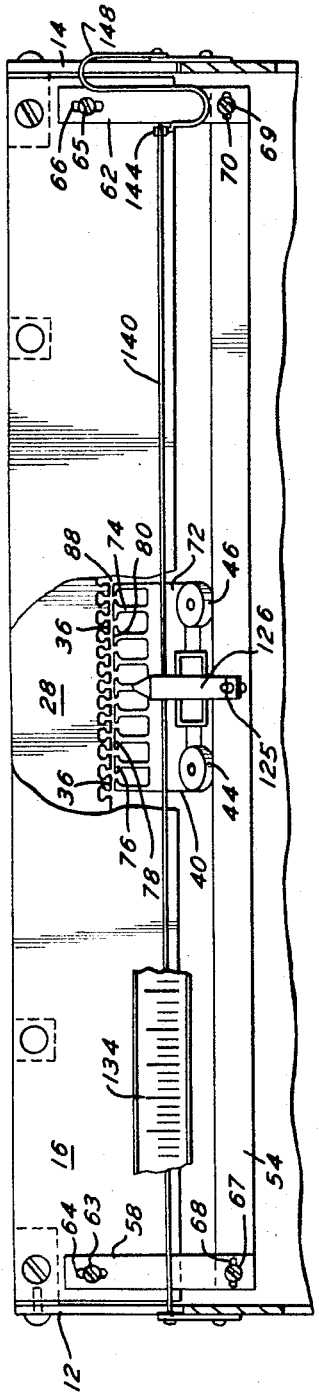
FIGURE 2 is a top plan view of the device shown in FIGURE 1 with a portion of the rotor broken away to show the stator.
FIGURE 3 is a partial front view taken along the line 3—3 in FIGURE 1.

The motor includes a pair of frames 12 and 14 interconnected by a pair of side track members 16 and 18. The frames 12 and 14 may be made of a nonmagnetic or magnetic material as desired. Side members 16 and 18 may be made of a magnetic material or non-magnetic material. However, magnetic material is preferred for members 16 and 18 for shielding purposes. As shown in FIGURE 2, mounting blocks 20, 22, 24 and 26 are bolted or otherwise attached to frames 12 and 14. Mounting blocks 20, 22, 24 and 26 serve to support the side track members 16 and 18 and the laminated armature 28. Thus, fasteners 30 and 32 extend through side track members 16 and 18, mounting blocks 20, 22, 24 and 26, and armature 28 thereby retaining the same in place. Additional support for armature 28 is provided by mounting blocks 21, 23, 25 and 27 and fasteners 29 and 31.

As shown more clearly in FIGURES 1 and 2, the armature 28 includes a plurality of laminations 34 having flat pole faces 36 formed thereon. Short circuiting bars 37 and 38 extend parallel to the laminations 34 on both sides thereof and are coupled by armature bars 39 disposed at an angle with respect to the longitudinal axis of the armature 28. The armature bars 39 may be arranged to be perpendicular to the longitudinal axis of the armature 28, if desired. As indicated above, fastening means 30 and 32 hold the armature 28 fixedly to mounting blocks 20, 22, 24 and 26.

A stator 40 is reciprocally guided by the bottom surface of side track members 16 and 18. As shown in FIGURE 4, a stator supporting block 42 is provided with two pairs of bearings 44 and 46 mounted on the side of said supporting block 42 below side track member 16. A flat surfaced bearing 48 is mounted on the opposite side of supporting block 42 below side track member 18. The bottom of side track member 16 has been provided with a rounded edge 50 which fits into the space between the pairs of bearings 44 and 46. Each of the pairs of bearings 44 and 46 is mounted with its individual bearing adapted to rotate about axes which are angled at 120°. In this way, side member 16 and bearings 44 and 46 provide a means to guide stator 40 as it reciprocates beneath armature 28. Further, the arrangement herein described substantially eliminates all wobble. The bearings 44 and 46 are flat surfaced and make only point contact with the rounded edge portion 50 of side track member 16, thereby reducing friction. Bearing 48 is flat and rides smoothly on a round bottom portion 52 of side track member 18.

The stator 40 is shown in its operative position in FIGURE 1, wherein bearings 44, 46 and 48 are in contact with the side track members 16 and 18. In its inoperative disposition, the stator 40 rests on lower track members 54 and 56. Lower track members 54 and 56 are adjustably supported immediately beneath supporting block 42 by means of bars 58, 60 and 62. A fourth bar (not shown) is also provided immediately behind bar 62. Bars 58, 62 and 60 are attached to side members 16 and 18 by means of screw fasteners 63 and 65 inserted through slots 64 and 66. Lower track members 54 and 56 are attached to the bars by such means as screw fasteners 67 and 69 inserted through slots 68 and 70. In this manner, the lower track members 54 and 56 can be adjusted to a position wherein they are parallel to side track members 16 and 18 and spaced below said track members 16 and 18 by a distance that allows the supporting block 42 to move just out of contact with the lower track members 54 and 56 when stator 40 is in its operative disposition.

Stator 40 is provided with a laminated magnetic core 72 supported on supporting block 42. A nonconductive material may be disposed between supporting block 42 and magnetic core 72. The supporting block 42 and bearings 44, 46 and 48 supported thereby are made from a lightweight material which may be nonmagnetic.

Magnetic core 72 is provided with a plurality of pole pieces such as pole piece 74 which terminates in flat pole faces such as pole faces 76, 78 and 80. Windings such as windings 82, 84 and 86 extend around the pole pieces. The windings shown are intended to be representative only and do not necessarily conform to the actual windings used. Conductors (not shown) are coupled to the windings in a manner which enables the stator to produce a moving magnetic field along the length thereof.

Stationary armature 28 is fixedly supported above the stator 40 and an air gap 88 is formed therebetween. Air gap 88 is horizontally disposed and its size is limited by contact between the side track members 16 and 18 and the bearings 44, 46 and 48. The air gap 88 is fixed when the motor is assembled so as to provide the proper reluctance for the magnetic path generated by the stator windings. It has been found that for most efficient operation the gap 88 should be within the range of .004–.008 inch. The preferred gap is .006 inch.

The moving stator represents one pole of an induction motor. A moving magnetic field is generated by the windings wound on stator 40. Said moving magnetic field generated by the windings induces a current in short circuiting bars 38 and armature bars 39 which in turn generates a counter magnetic field. The two generated magnetic fields set up a resultant force which acts on the stator pole faces 80 and causes the stator to move relative to the armature. The windings on stator 40 may be wound for two phases and a single pole in each phase, with phases spaced 90 electrical degrees apart. The winding on stator 40 is designed to cause the magnetic field generated thereby to selectively sweep in one direction only and then in the opposite direction as desired. For this, each phase has two like pairs of coils to cut down harmonics. For example, the magnetic field may be caused to sweep constantly from left to right. However, reversal of the phase of one of the stator windings causes reversal in the direction of the movement of the stator magnetic field. Thus, if the field was previously sweeping from left to right it now sweeps from right to left. Accordingly, reversal of the phase of one of the stator windings also causes reversal in the movement of the stator with respect to the armature. In this manner, the stator may be controlled for reciprocal movement with respect to the armature.

Referring now to FIGURES 4, 5 and 7 there is shown a detailed view of the stator 40. As shown the stator supporting block 42 is in the from of an annulus. The laminated magnetic core 72 extends across the annulus and is held in place by a pair of retaining bars 90 and 92 which extend through core 72 and are bolted to the annular supporting block 42 by screw fasteners 94, 96, 98 and 100. Screw fasteners 94, 96, 98 and 100 draw retaining bars 90 and 92 toward annular supporting block 42 thereby holding core 72 against the top surface of said supporting block 42.

It has been determined that in those instances where it is desirable to remove minor vibration, the core 72 may be shifted closer to bearing 46. This is done by eliminating fastener 100 and supporting bars 90 and 92 in cantilever fashion.

A wire terminal arm 102 is attached to the bottom of supporting block 42 on one side thereof. The wire terminal arm 102 is provided with several terminal posts 104 to which current carrying conductors 106 are attached. Said conductors 106 extend through holes 108 in terminal arm 102. Conductors 106 carry the current for energizing the stator windings.

A bar or arm 110 is fixedly attached at one end thereof to the neck portion 112 extending from the side of annular supporting block 42. The arm 110 may be a hollow tubular member provided with holes 114, 116, 118, 120, 122 and 124.

The free end of bar 110 is removably coupled to a pointer 126 upon which is mounted pen 125. The pointer 126 is supported in a slot 128 provided on the end of arm 110 for that purpose. The pen 125 is adapted to provide a record of the movement of stator 40 on the motor driven sheet 130 of recorder 132. The recorder 132 is of the type that continuously drives a record sheet 130 beneath pen 125 at a predetermined turning rate. It will be understood that any type of standard pen and recorder system may be used by those practicing the principles of the present invention.

The information recorded on sheet 130 may assume a wide variety of forms such as temperature, liquid level, humidity, speed, etc, which vary in accordance with some measured value as will be made clear hereinafter. The linear induction motor 10 is removably mounted on top of recorder 132 by means of mounting blocks 133.

A ruled scale 134 is removably mounted on the recorder 132 by attaching it to the ends of brackets 136. The pointer 126 cooperates with the ruled scale 134 to indicate the position of stator 40 relative to armature 28. If desired, scale 134 may be calibrated in terms of temperature, liquid level, humidity, speed, etc.

The stator 40 is coupled to a slidewire potentiometer mounted on brackets 136 which are integral with frames 12 and 14. As is best shown in FIGURE 2, the potentiometer comprises a plurality of U-shaped slidewires mounted with their free ends adjacent to frame 12 and with their bight ends extending around guides supported on the end of resilient S-shaped supporting members attached to frame 14. The plurality of slidewires may be resistance wires having varying ohmic values per linear foot for correlation with different values to be measured. Since all of the slidewires are mounted in a similar manner, only slidewires 138 and 140 will be described.

As shown in FIGURE 2, the terminal ends of slidewires 138 and 140 are attached to the insulating connector 142 mounted on one of brackets 136. Connector means may be provided thereon for receiving wire leads. The slidewires 138 and 140 extend around the insulated guides 144 and 146, which are supported on the free ends of the S-shaped resilient supporting member 148. The resilient supporting member 148 is fixedly mounted on a support bracket 150, which is attached to frame 14.

Figure 8:
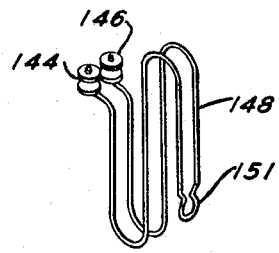
FIGURE 8 is a perspective view of one of the slidewire retaining means.

In FIGURE 8 there is shown a detailed view of the resilient supporting member 148 together with guides 144 and 146. As shown, supporting member 148 is made from a single piece of resilient spring material formed as a pair of S-shaped springs which are joined at one end thereof. A crimp 151 is provided adjacent the joined end of each S-shaped spring so that a fastening means 153 with an enlarged end portion may be inserted through the opening formed by the bight and crimp to thereby retain the suporting member 148 upon insulated bracket 150. The free ends of supporting member 148 are bent over in a horizontal direction and then upwardly in a verical direction so that insulated guides 144 and 146 can be supported thereon. It will be noted that guides 144 and 146 are provided with tapered grooves adapted to accept the slidewires 138 and 140 and prevent them from slipping off. Supporting member 148 may be made of any resilient spring material such as spring steel.

When slidewires 138 and 140 are placed around guides 144 and 146 and pulled taut, the effect is to resiliently extend the S-shaped portions of supporting member 148, creating an enlargement of the S-shape. Since the supporting member 148 is made of a resilient material, there is a spring like action which holds the slidewires 138 and 140 under tension.

A plurality of like contact posts, such as post 152, are mounted on the arm 110. Referring now to FIGURE 6, wherein an enlarged detailed view of one of the contact posts 152 is shown, it can be seen that the post 152 is retained on arm 110 by means of a threaded fastener 154 which extends through the hole 124 in arm 110. The fastener 154 threadably engages central contactor post 156 and holds the same in place. The central contactor 156 is made of an electrically conductive material and is of sufficient diameter that it will contact slidewire legs 138a and 140b of slidewires 138 and 140. As shown in FIGURE 6, a U-shaped spring 158 having upstanding end portions 160 and 162, is attached to central contactor 156. End portions 160 and 162 have a spring like action tending to force them against central contactor 156. As best shown in FIGURE 4, the ends of upstanding end portions 160 and 162 are flared out to form V-like portions 164 and 166.

When assembled, the slidewires 138a and 140b are inserted between the contactor posts 156 and the V-like portions 164 and 166. Since the contactor posts 156 are cylindrical in shape and the end portions 160 and 162 have a V-like shape 164 and 166 only point contact is made with the slidewire legs 138a and 140b. The effect of the spring-like action of the U-shaped spring 158 is to bias the slidewire legs 138a and 140b against a central contactor post 156. The spring bias pressure of the end portions 160 and 162 can be as low as one gram.

When stator 40 moves beneath armature 28 it carries arm 110 with it. Accordingly contactor post 156 forms a movable shorting connection between slidewires 138 and 140. Thus, if slidewires 138 and 140 represent potentiometer resistances and wire 140 is shorted at its open end to form a low resistance pick up bar, the resistance in said potentiometers is being changed as central contactor 156 connects slidewires 138 and 140 together at different positions therealong.

The slidewire 138 is preferably made from a commercially available alloy having a high resistance such as 1,525 ohms per foot. Slidewire 140 is made of the same alloy but of larger diameter to give relatively low resistance. As a result of using the above-described construction, substantially minimal wear will occur, an infinite resolution will be obtained and exteremely little current will be drawn. Further, it will be noted that the spring biased portions 164 and 166 hold the slidewire legs 138a and 140b against central contactor post 156 with sufficient spring pressure to avoid any bouncing of the contacts which could result in chatter. The potentiometer as thus described, using the contact post 152 with spring biased portions 164 and 165, has substantially infinite resolution.

It should be noted that the infinite resolution potentiometer thus achieved is relatively low in cost and yet performs as well as much more expensive potentiometers.

FIGURE 9 represents a schematic illustration of one example of the manner in which the potentiometer and linear induction motor 10 can be used. As shown, power sources 170 and 171 are connected across the resistance 172 and slidewire 138. In actual operation the power source 171 would be connected to the terminal ends of slidewire 138 on connecting block 142. The resistance 172 has a variable potentiometer contact 176 directly connected to one terminal of the stabilized chopper amplifier 174. Said amplifier 174 is well known in the art and commercially available. The contact 176 varies its position upon resistance 172 with a measured value such as temperature, liquid level, humidity, speed, etc. The contactor 156 is in intimate contact with slidewire 138 and pickup slidewire 140. Slidewire 138 is coupled to the other terminal of amplifier 174 by pickup slidewire 140. In actual operation, the terminal ends of slidewire 140 would be electrically tied together.

Any voltage that would be developed across the input terminals of amplifier 174 represents an error signal. Such error signal is a result of a voltage change such as, for example, the position of potentiometer contact 176. The voltage change could emanate as a result of or from a change in temperature, liquid level, humidity, speed, etc., transducer. The amplifier 174 will amplify the voltage representative of the error signal and apply it to the stator windings of motor 10. The stator will then shift position in a direction determined by the phase of the error voltage. As the stator moves it also shifts the position of contact post 156, thus varying the effective resistance presented to amplifier 174 by slidewire 138. This will correct the imbalance in the system by reducing the error signal to zero. The amount of movement of the stator required to balance the system will be recorded by the pen on the driven record sheet.

Figure 10:
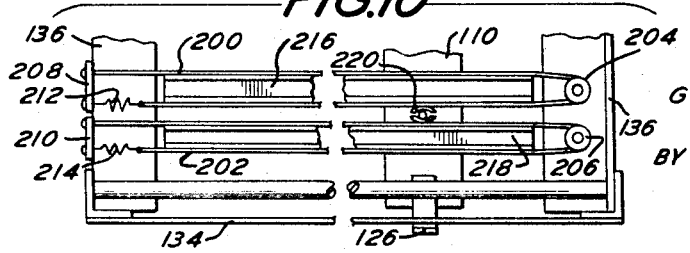
FIGURE 10 is a partial plan view of an alternate slidewire and contact mechanism.

Referring now to FIGURE 10, there is shown an alternative construction of the slidewire. In this construction, the slidewires 200 and 202 are formed as a pair of single U-shaped wires extending around insulated supports 204 and 206. One of the terminal ends of each of the slidewires 200 and 202 is mounted on the insulated blocks 208 and 210. The other ends are respectively connected to springs 212 and 214 which are connected to said insulated blocks 208 and 210. Springs 212 and 214 may be made of a resilient current conducting material. Channel members 216 and 218 are mounted between each of the slidewires 200 and 202. With the channel members 216 and 218 thusly mounted, the slidewires 200 and 202 rest against the side walls thereof.

A contactor 220 comprising two upwardly extending resilient contact members is mounted on bar 110. The contactor 220 may comprise a pair of electrically connected and conducting resilient members which have an outward spring bias and thus tend to rest against the slidewires 200 and 202. The combined action of the force of the spring-like contactor 220 and the walls of the channel members 216 and 218 assures good electrical contact. Moreover, the springs have very little tendency to vibrate, therefore assuring that electrical contact between the contactor 220 and slidewires 200 and 202 is never lost. If desired, the slidewires may be fixed to the walls of the channel members by means of a cement such as epoxy. This will eliminate all vibration. Springs 212 and 214 serve to tension the slidewires 200 and 202.

It will be understood by those skilled in the art that the linear induction motor can be a single phase, two phase, or any polyphase induction motor with auxiliary starting means.

Those skilled in the art will also recognize that the air gap 88 may be adjusted if desired.

The present invention may be embodied in other specific forms without departing from the spirit or essen-

I claim:

1. A linear induction motor comprising an armature having pole pieces along a straight line, said armature pole pieces being made of a magnetic material, a stator having pole pieces along a straight line, said stator pole pieces being made of a magnetic material, said stator being positioned vertically below and juxtaposed to said armature, said stator and said armature pole pieces having pole faces which define a uniform straight gap therebetween, a plurality of electrical conductors wound on said stator for establishing a moving magnetic field in said gap when energized, a guide bearing means rotatably mounted on said stator, track means mounted along the entire length of said armature and aligned vertically above said bearing means, said bearing means and said track means being so positioned one above the other that the width of said uniform gap between said armature and said stator pole faces is precisely defined when said bearing means is in engagement with said track means.

2. A linear induction motor comprising a straight armature having a plurality of pole pieces with flat pole faces formed thereon, said pole pieces being made of a magnetic material, current conducting armature bars extending between said pole pieces, current conducting short circuit bars extending parallel to said armature and short circuiting said armature bars, a support for fixedly supporting said armature, a straight stator juxtaposed to and vertically below said armature, said stator having pole pieces with flat pole faces, said stator pole pieces being made of a magnetic material, said stator being mounted in its operative position with said stator pole faces above said armature pole faces to define a uniform straight gap between said armature and stator pole faces, a plurality of conductors wound about said stator pole pieces, said conductors being wound to establish a moving magnetic field in said gap when energized, rotatable bearing means mounted on opposite sides of said stator, a pair of track means extending along the length of said armature and parallel thereto, one of said track means being above and in vertical alignment with one of said bearing means, the other of said track means being above and in vertical alignment with the other of said bearing means, said bearing means and said track means cooperating to guide said stator in a straight line movement below said armature.

3. A slidewire potentiometer having infinite resolution comprising a plurality of pairs of slidewires, each pair of slidewires being a unitary straight continuous piece of resistance material extending around a resilient support, electrical contacts extending between adjacent pairs of slidewires and engaging one of the slidewires in each pair of said adjacent pairs along a side thereof, spring means biasing the slidewires into contact with said electrical contacts, a movable arm, said electrical contacts being mounted on said arm so that the contacts are displaced along said slidewires when said arm is caused to move.

4. A motor in accordance with claim 1 including a slidewire potentiometer coupled to said stator, said motor and potentiometer being removably mounted as a unit upon a recording means, and pen means mounted on said motor, said pen means cooperating with said recording means to indicate relative movement between said stator and said armature.

5. A motor in accordance with claim 1 including a slidewire potentiometer coupled to said stator, said slidewire potentiometer comprising a slidewire, electrical contact means engaging the slidewire along a side thereof, said electrical contact means being mounted on an arm extending from said stator so that said contact is displaced along said slidewire when said stator is caused to move, said electrical contact means comprising a substantially U-shaped spring having a pair of leg portions joined at one end thereof, said spring being made of a resilient material adapted to bias said legs together.

6. A motor in accordance with claim 1 including a slidewire potentiometer coupled to said stator, said slidewire potentiometer comprising a plurality of pairs of slidewires, each pair of slidewires being a unitary continuous piece of resistance material extending around a resilient support, electrical contacts extending between adjacent pairs of slidewires and engaging one of the slidewires in each of said adjacent pairs along a side thereof, spring means biasing the slidewires into contact with the sides of said electrical contact, an arm extending from said stator and movable therewith, said electrical contacts being mounted on said arm so that the contacts are displaced along said slidewires when said stator is caused to move.

7. A motor in accordance with claim 1 including a slidewire potentiometer coupled to said stator, said slidewire potentiometer comprising a plurality of pairs of slidewires, each pair of slidewires being a unitary continuous piece of resistance material extending around a support, electrical contact means extending between adjacent pairs of slidewires and engaging one of the slidewires in each of said adjacent pairs along a side thereof, wall means extending between the slidewires in each pair, means joining at least said one slidewire in each pair to the said wall means, an arm extending from said stator and movable therewith, said electrical contact means being mounted on said arm so that the contacts are displaced along said slidewires when said stator is caused to move.

8. A motor in accordance with claim 1 including a slidewire potentiometer coupled to said stator, said slidewire potentiometer comprising a plurality of pairs of slidewires, each pair of slidewires being a unitary continuous piece of resistance material extending around a support, electrical contact means extending between adjacent pairs of slidewires and engaging one of the slidewires in each of said adjacent pairs along a side thereof, a plurality of channel means co-extensive of said slidewires, each of said channel means including a pair of walls and a web joining said walls, said walls extending between the slidewires comprising adjacent pairs, means joining said one slidewire in each pair to the surface of a wall, an arm extending from said stator and movable therewith, said electrical contact means being mounted on said arm so that the contacts are displaced along said slidewires when said stator is caused to move.

9. An induction motor in accordance with claim 1 wherein said bearing means comprise a first rotatable bearing on one side of said stator, said first bearing being adapted to rotatably cooperate with a round track surface on the track means adjacent said first bearing, and second bearing means on the side of said stator opposite said first bearing means, said second bearing means including at least one pair of rotatable bearings mounted to rotate about axes at an angle to each other, said second bearing means being adapted to cooperate with a rounded track surface on the track means adjacent said second bearings.

10. A motor in accordance with claim 1 including a slidewire potentiometer coupled to said stator.

11. A motor in accordance with claim 6 wherein said resilient slidewire supports comprise a pair of S-shaped portions joined at one of the ends thereof, and slidewire guides mounted on the other ends thereof.

12. A motor in accordance with claim 10 wherein said slidewire potentiometer comprises a slidewire, an electrical contact engaging the slidewire along a side thereof, a spring means biasing the slidewire into contact with a side of said electrical contact, and said electrical contact being mounted on an arm extending from said stator so that said contact is displaced along said slidewire when said stator is caused to move.

13. A motor in accordance with claim 1 wherein an arm is mounted on said stator for movement therewith, a pointer mounted on said arm, a scale means extending between said frame means, said pointer cooperating with said scale means to indicate the position of said stator relative to said armature.

14. A motor in accordance with claim 6 wherein said resilient supports comprise one of a pair of S-shaped springs, said spring being joined together at one end thereof, the other end of said springs being adapted to support an insulating slidewire guide, and a crimp formed in each of said springs adjacent said joined ends thereof, whereby said crimp and said joined ends form a mounting portion for said springs.

15. A slidewire potentiometer in accordance with claim 3 wherein said resilient slidewire supports comprise a pair of S-shaped portions joined at one of the ends thereof, and slidewire guides mounted on the other end thereof.

16. A slidewire potentiometer having infinite resolution comprising elongated straight continuous slidewires, electrical contact means engaging the slidewire on a side thereof, said electrical contact means including a substantially U-shaped spring having a pair of legs joined together at one end thereof, said spring being made of a resilient material formed to bias said legs apart, said electrical contact means being mounted on a movable arm, each leg being biased into contact with a different slidewire.

17. An infinite slidewire potentiometer comprising a plurality of pairs of straight slidewires, each pair of slidewires being a unitary continuous piece of resistance material extending a support, electrical contact means extending between adjacent pairs of slidewires engaging one of the slidewires in each of said adjacent pairs along a side thereof, a plurality of channel means co-extensive of said slidewires, each said channel means including a pair of walls and a web joining said walls, said walls extending between the slidewires comprising adjacent pairs, means joining said one slidewire in each pair to the surface of a wall, a movable arm, said electrical contact means being mounted on said arm so that the contacts are displaced along said slidewires when said arm is caused to move.

18. An induction motor comprising an armature having pole pieces along a straight line, a single pole stator having pole pieces along a straight line, means mounting said stator and armature in vertical alignment defining a uniform straight air gap therebetween, both said stator and said armature having substantially flat vertically opposed pole faces to define said air gap therebetween, a plurality of conductors wound on said stator for establishing a moving magnetic field in said air gap when energized, said armature pole pieces being made of magnetic material with a short circuited conductor extending therebetween, guide bearing means mounted on said stator, track means mounted along the length of said armature adjacent said bearing means, and said bearing means cooperating with said track means to guide said stator in straight line movement along said armature, said bearing means and track means being positioned to define the width of said air gap.

References Cited

UNITED STATES PATENTS

| | | | |
|---|---|---|---|
| 269,760 | 12/1882 | Weston | 338—316 |
| 575,699 | 1/1897 | Chaplin et al. | 310—12 |
| 1,881,014 | 10/1932 | Ayers | 310—13 |
| 2,337,430 | 12/1943 | Trombetta | 310—13 |
| 2,655,426 | 10/1953 | Barnes | 346—139 |
| 2,747,061 | 5/1956 | Sorber | 338—125 |
| 2,846,641 | 8/1958 | Basham | 346—32 |
| 2,931,963 | 4/1960 | Wilson | 310—13 |
| 3,259,768 | 7/1966 | Burr | 310—13 |

RICHARD B. WILKINSON, *Primary Examiner.*

J. G. MURRAY, H. B. KATZ, *Assistant Examiners.*